United States Patent [19]

Valentin

[11] 4,452,046
[45] Jun. 5, 1984

[54] SYSTEM FOR THE OBTAINING OF ENERGY BY FLUID FLOWS RESEMBLING A NATURAL CYCLONE OR ANTI-CYCLONE

[76] Inventor: Zapata M. Valentin, Lerida No. 3, Madrid-20, Spain

[21] Appl. No.: 281,503

[22] Filed: Jul. 8, 1981

[30] Foreign Application Priority Data

Jul. 24, 1980 [ES] Spain .................................. 493.713

[51] Int. Cl.³ .............................................. F03G 7/02
[52] U.S. Cl. ............................. 60/641.11; 60/641.12; 60/676; 290/55; 415/2 A
[58] Field of Search ............ 60/641.8, 641.11, 641.12, 60/641.13, 398, 676; 203/DIG. 20; 290/44, 55; 415/2 A, 2 R, DIG. 8

[56] References Cited

U.S. PATENT DOCUMENTS

| | | | |
|---|---|---|---|
| 3,936,652 | 2/1976 | Levine | 290/55 X |
| 3,979,597 | 9/1976 | Drucker | 290/55 |
| 4,118,636 | 10/1978 | Christian | 60/641.12 X |
| 4,275,309 | 6/1981 | Lucier | 60/641.12 |

Primary Examiner—Allen M. Ostrager
Assistant Examiner—Stephen F. Husar
Attorney, Agent, or Firm—Wenderoth, Lind & Ponack

[57] ABSTRACT

A system for obtaining energy by means of fluid flows resembling those of a natural cyclone or anti-cyclone comprises a cyclonic conversion tower constituted by a group of convectors all situated round an axis toward which there are directed vortical membranes or screens contained in trumpet-shaped revolution bodies. At its top or bottom the conversion tower optionally bears deflectors or diffusers which increase output. Devices for conversion of electrical or mechanical energy from the kinetic energy of the flow are located at both the top and the base of the tower of convectors. The convection tower optionally is situated on a base which permits the passage of solar radiation with the aim of utilizing its energy, the assembly being completed by a conventional heating system for alternative use.

7 Claims, 18 Drawing Figures

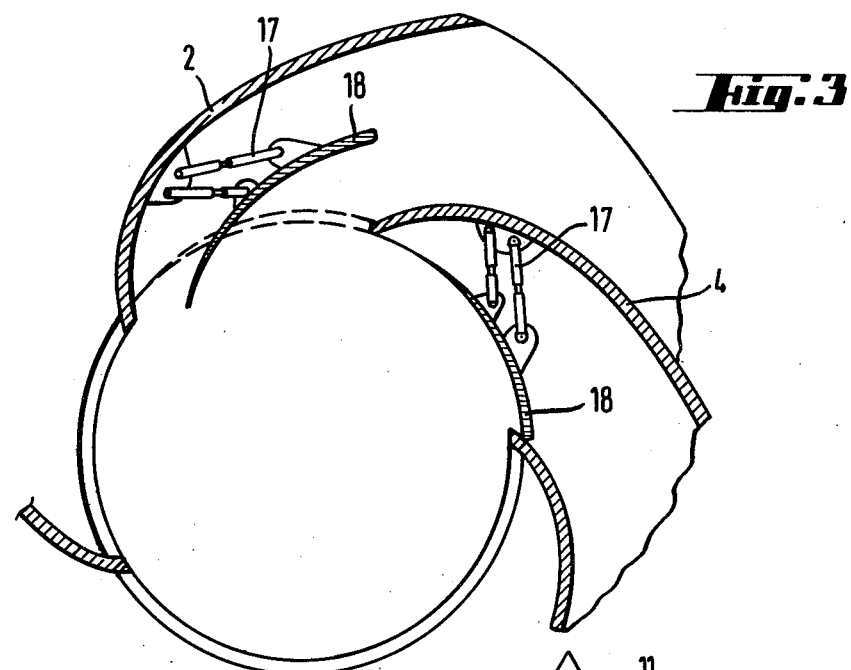
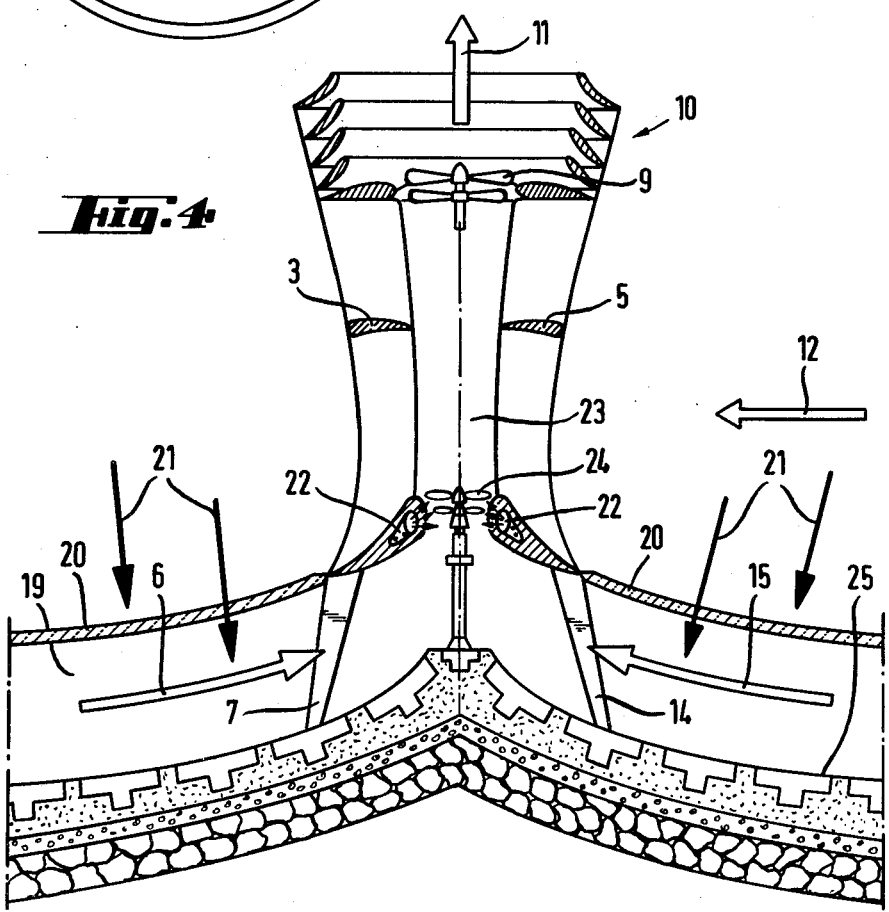

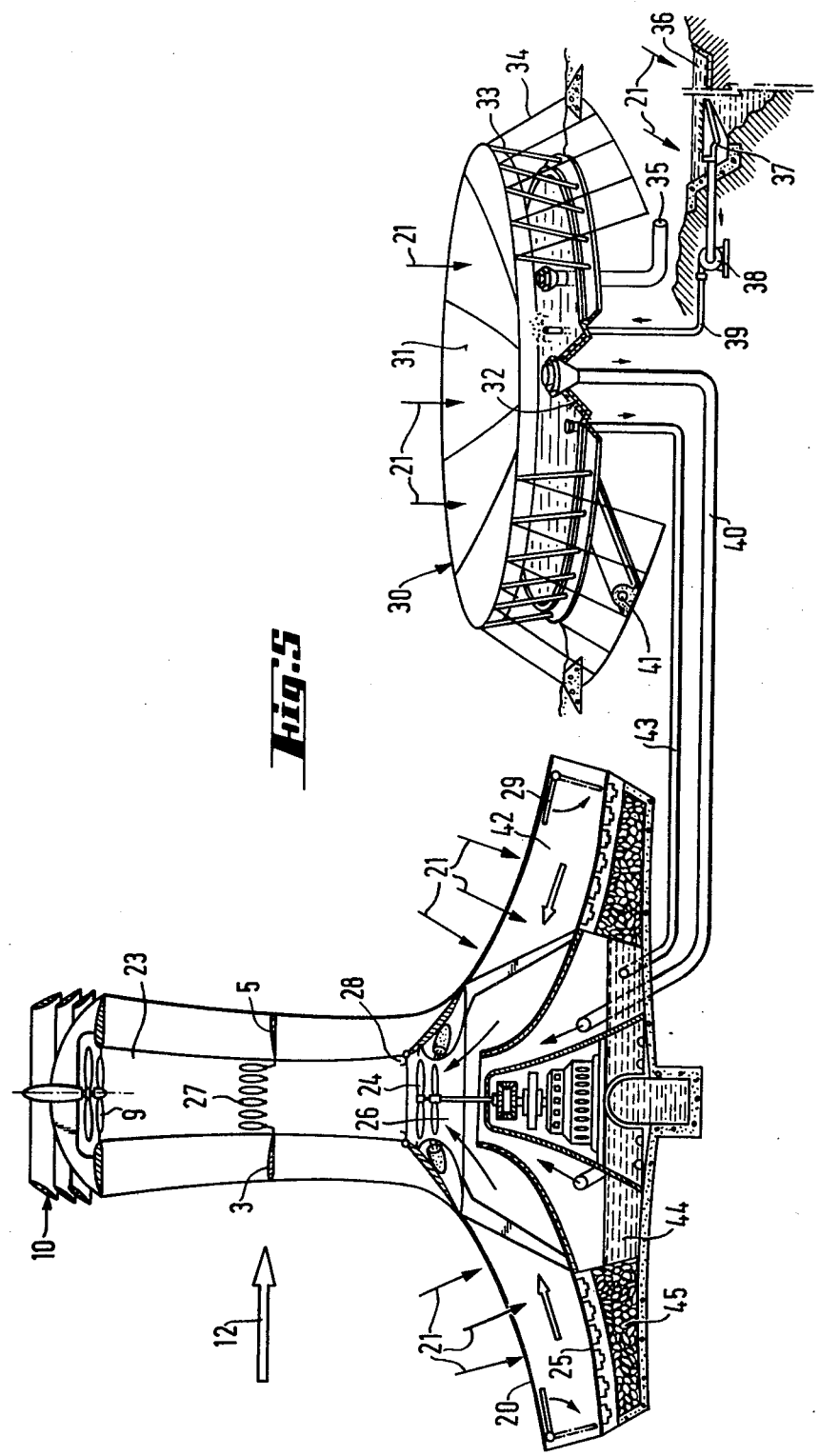

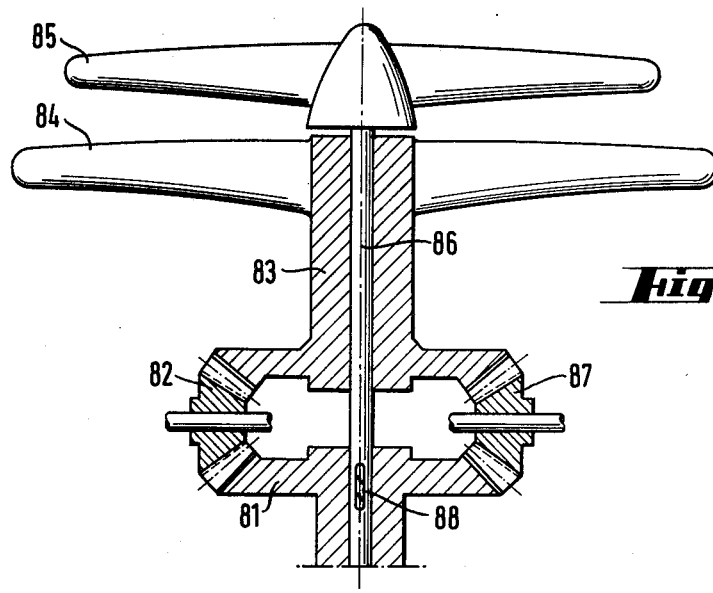
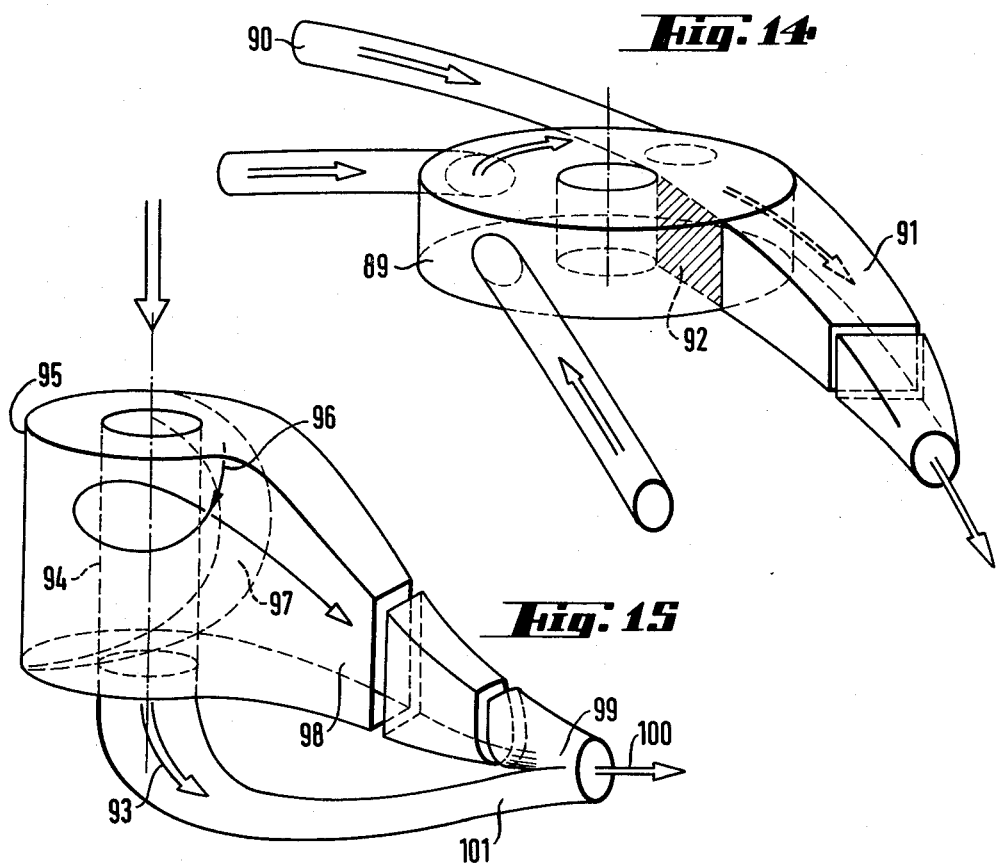

SYSTEM FOR THE OBTAINING OF ENERGY BY FLUID FLOWS RESEMBLING A NATURAL CYCLONE OR ANTI-CYCLONE

BACKGROUND OF THE INVENTION

This invention relates to a system for the obtaining of energy by means of fluid flows similar to those forming a natural cyclone or anti-cyclone which permits coverage of the whole range of powers required by humanity, its origin being such that it can be installed in any location. The energy obtained with the system is produced by the artificial reproduction in suitable structures of confined vortices having a cyclonic configuration from the kinetic energy originating from flows or by taking advantage of the pressure differences existing in the atmosphere as well as the components due to the thermal gradients existing therein. This system permits known phenomena such as cyclones, tornados, typhoons, whirlwinds, etc. to be reproduced by analogy and allows the energy produced therein as well as desalinated water to be obtained. For the description of the system, we will make use of a concrete example of the design to which there correspond the enclosed figures presented as embodiments, which are not intended to be limiting since the specific data in each case are in accordance with the requirements of the design, without the modifications in detail affecting the essence protected in a general manner by the present registration.

SUMMARY OF THE INVENTION

The system described differs from the prior art in that it allows use to be made of 83% of the energy in contrast to the considerably smaller percentages obtained at present with wind systems, due to the fact that the entering flow is subjected to convective acceleration by natural causes, consequently producing the three basic flows of a natural cyclone which are: the convective flow accelerated by the law of continuity, the non-rotating flow, and the rotating flow, which permits vortical nuclei of limited size to reach very high degrees of energy concentration without design limits in the size of the structures used.

One of the fundamental elements for the artificial production of cyclones or anti-cyclones is constituted by the convectors composed of two vertical membranes or screens which are almost tangential to a central cylindrical duct whose generatrices follow a curved profile in such a way that their presence, together with the central duct, causes in the flow an acceleration defined by the laws of aerodynamics, compelling the natural wind to increase its velocity, accelerating at three consecutive points which are: the curved screen, the actual convector, and the vortical duct. These convectors are at any level, without communicating with the flow at the floor or foundation level of the system, and are intended to convey, deflect and accelerate convectively a substantially horizontal transverse flow.

The system permits the reproduction in suitable structures of confined artificial cyclones which, in the same manner as natural cyclones, make use of the solar energy as well as the kinetic and thermal energy in the atmosphere.

Similarly, this system permits different thermal exploitation of sea water to be integrated in a technological device encompassing wind, radiant solar, and thermal sea water energy, creating a transformation which uses not only the kinetic energy of the wind but also the position or baric energy, the thermal energy of the air depending on its degree of saturation by water vapour, and the thermal energy of sea water.

A secondary, but important aspect is the obtaining of desalinated water by the cyclonic conversion process in units which operate with a secondary suction flow of air saturated with water vapour.

As we have stated, cyclonic conversion is characterised in that it transforms horizontal energy flows into vertical energy flows, absorbing or not absorbing in the vertical flow other flows originating from other energy sources such as radiant solar energy or marine thermal energy.

BRIEF DESCRIPTION OF THE DRAWINGS

Other features of the invention will be apparent from the following description by reference to the accompanying drawings, in which:

FIG. 3 is a cross-section through a tower of convectors showing vertical screens and blocking devices;

FIG. 4 is a fragmentary view of an energy converter unit;

FIG. 5 illustrates another form of cyclonic tower;

FIG. 13 shows a force rotation reversal device;

FIG. 14 shows a flow collector;

FIG. 15 shows a decyclonizing device; and

DETAILED DESCRIPTION OF THE INVENTION

Figure 1:
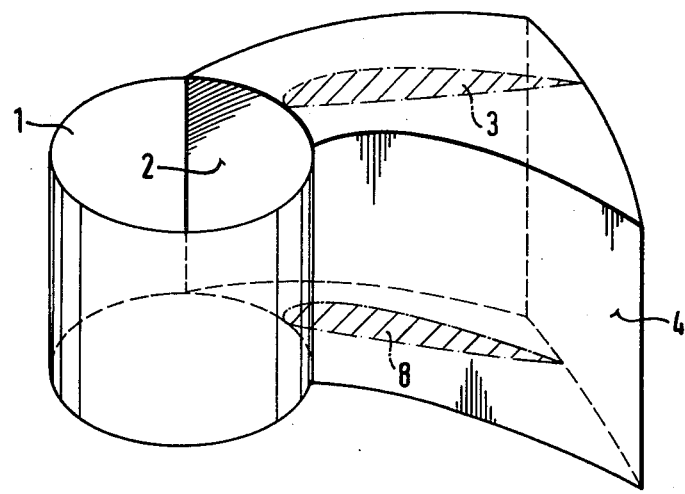
FIG. 1 shows a vortex duct of a cyclonic tower.

Cyclonic towers are composed fundamentally of convectors with their vortical duct as in the drawing in FIG. 1 which shows vertical membranes or screens 4 and 2 joined together by stiffeners constituted by horizontal plates with streamlined sections 3 and 8. The vertical screens 4 and 2 of which there are two per convector are generated over a curve such as a circle, ellipse, hyperbola, parabola, logarithmic or hyperbolic spiral or any other type, to a suitable height, and between each two consecutive screens 2 and 4 there is formed a convector which concentrates the flow of energy flowing to the vortical duct 1 divided by all the convectors if there are more than one. A cyclonic or anti-cyclonic tower is constituted by one or more convectors like the one just described which are formed between two stiffeners 3 and 8 and two consecutive screens 2 and 4 forming various levels, the tower being cyclonic if the fluid turns in an anti-clockwise direction and anti-cyclonic if it turns in a clockwise direction, in the northern hemisphere.

Figure 2:
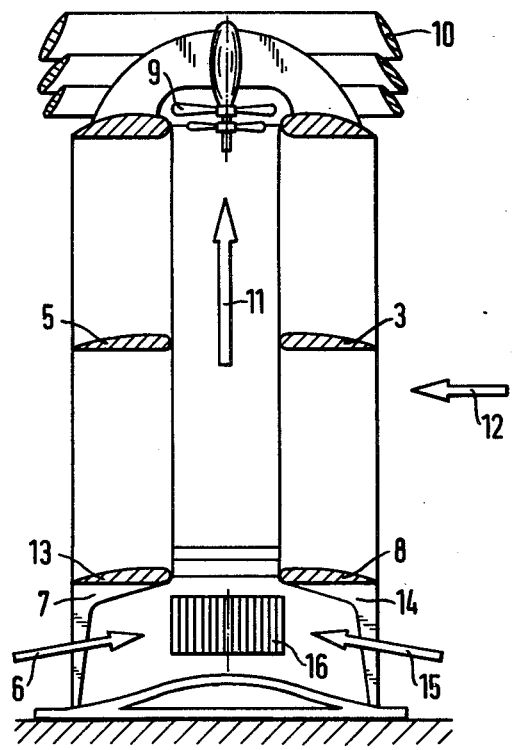
FIG. 2 is a diagrammatic view of a cyclonic or anti-cyclonic tower.

FIG. 2 shows a diagrammatic cyclonic or anticyclonic tower. Four stiffeners 3, 5, 8 and 13 and the tower-supporting piles 14 and 7 can be seen therein. In this Figure the arrow 12 indicates the direction of the wind entering the tower and the arrow 11 the direction of the flow making this tower a cyclonic tower as the direction is from bottom to top. The flow also enters in the directions indicated by the arrows 15 and 6, which flow actuates the relevant converter device which, in FIG. 2, is a turbine 16 at the bottom, an assembly of propellers or blades 9 being situated in the upper portion, of which the rotors are contra-rotating and are at the top of the tower inside the diffusers 10. The deflectors would be situated in the lower portion of FIG. 2.

Devices for transforming the kinetic energy of the flow into electrical or mechanical energy, such as pumps, generators, compressors, dynamos, alternators, etc. are situated without distinction at either of the ends or at both ends, both at the base and at the top of a tower of convectors.

FIG. 3 shows a cross-section through a tower of convectors, showing the section of the vertical membranes or screens 4 and 2 as well as the blocking devices 18, for blocking the intake of the flow into the vortical duct resting on the damping arms 17 turning about the support and opening when they are located at the convector which should permit the passage of fluid by attracting it in the direction of the wind, providing that the streamlined profile of the blocking device 18 positions it in such a way that it has the minimum resistance thereto and, nevertheless, shuts itself when the fluid attempts to circulate inside the convector towards the exterior from the vortex already created. The blocking devices 18 turn when the air enters a convector in such a direction that it pushes the blocking device 18 from the outside inwards causing it to be located in the position having least resistance to the intake of air, whereas it remains closed when the air travels from the inside outwards, keeping this given convector blocked. The convectors have one or more recovery damping devices 17 which are actuated in a suitable direction by the actual flow.

If the blocking devices 18 lengthening the membranes 2 and 4 beyond their tangent to the flow until they form part of the vortical duct are removed from the convectors described with reference to FIG. 3, convectors will be obtained which can be used for units in which the power will be up to 5 kilowatts and the output will be of little importance with the considerable advantage that moving parts will be eliminated.

If the cyclonic conversion tower described above is provided at its base with a face 20 (FIG. 4) permitting the passage of solar radiation 21, said face 20 being made of for example glass, plastics, etc., preventing reflection to the ambient air retained under the face 20, in the scope of secondary suction by the cyclonic converter due to the known hothouse effect, the radiant solar energy is in the form of unstable hot air.

To increase the radiant heating effect of the solar cyclonic system, the system will comprise, at its base, a thermally absorbent black bottom 25 made of a material capable of accumulating heat.

The energy converter 24 which, in FIG. 4, is constituted by two propellers mounted on contra-rotating axles, receives the flow of thermal and kinetic energy. There are therefore two energy vectors in the displacement of the flow inside the vortical duct: one thermal vector and the other by transposition of kinetic energy in the main flow.

The heat accumulator and the thermally absorbent black bottom 25 constitute a regulating element which accumulates the heat during the day, giving off surplus at night and thus balancing the thermal wind.

The thermal energy plus the transposed kinetic energy give to the energy converters 24 and 9 in FIG. 4 their combined energy under the regularizing interactive influence of the paravortical flows created reciprocally.

To regularize the use of the installation in calm or cloudy climatic conditions, the tower with conversion of radiant solar energy is provided with an artificial heating aid based on burners 22 of gases of liquid fuels arranged in such a way that the entry of the hot gases of combustion will take place tangentially and horizontally at the base of the vortical duct 23 and with such an arrangement that the exhaust gases create an artificial vortex with suction at the secondary suction base 19 after having actuated the blade-type energy converter 24.

In a unit like the one just described, it is possible to use radiant solar energy and optionally thermal energy originating from combustion together with or distinctly from wind energy.

A unit like the one described with reference to FIG. 4 is provided with a base in the form of a tank 44 having a low level of water (FIG. 5) which receives hot water and saturated air from some pre-evaporators known as hydric hothouses 30 with a black thermally absorbent bottom 32 which is covered by a transparent surface 31 constituting the membrane sheet covering which forms hothouses 30 over the surface or sheet of water supplied from a large natural or artificial sheet of water 36 preheated by the sun's rays 21 and trapped by the surface sea water collector 37 pumped by the pump 38 which reaches the hydric hothouse 30 through the pipes 39 located above the thermally absorbent black bottom 32 and is heated even more by the sun's rays 21 striking the membrane sheet covering 31. This air is sent through the pipe 40 connected to the saturated air inlet to the top of the tank 44. In the same way, the tank 44 is filled by means of the pipes 43 with hot water from the hydric hothouse 30. The transparent covering 31 is supported by the pillars 33 and tightened by the tension rods 34. The ambient air enters the above-mentioned hothouse via the duct 35, the duct 41 serving for the extraction of salt. In the tank enclosure 44, due to the water received by it through the pipe duct 43 and the saturated air reaching the top from the hydric hothouse 30 through the pipe duct 40, it is possible to create the thermal conditions of a natural cyclone at the base of the cyclonic converter.

Using these devices it is possible to integrate the kinetic energy of the wind, the radiant thermal solar energy, the energy produced by combustion, in the base of the vortical duct, of gases or liquid fuels, the energy of the hot water at the surface of the sea due to saturation by hot air and the energy obtained by insulation of hydric hothouses 30.

As they can all be integrated easily, the maximum natural energy available can be extracted at any moment whether it is wind, solar, or thermal, from the sea. In the absence thereof, energy can be supplied by liquid and/or gaseous fuels, thus making the system independent from the prevailing climatic conditions.

In the tower illustrated in FIG. 5, the kinetic energy of the wind creates a depressed column drawing in the unsteady hot air generated by the face 20, the thermally absorbent black surface 25 and the accumulator 45. The rising column of air sucks saturated hot air from the pipes through duct 26 while the hot water enters through the tubing pipe 43.

The most suitable mixtures of saturated air and dry air 42 can be made by means of the blocking devices 29 acting as throttling deflectors for the secondary suction ducts.

This cyclonic tower which can be completely regulated lifts a column of saturated air by means of the depression created by the kinetic energy. The condensation of this air at a given height of the cyclonic conversion tower can produce at will condensed and desalinated water which is gathered in the thermal condensers 27 and is collected in the receivers 28 by means of suitable channels or pipes.

The heat of condensation imparted to the column of rising air reinforces the rising flow of the vortical flow, increasing the depression column and the paravortical flows. The rising thermal column generated in this way can therefore replace the kinetic energy of the wind up to the level of a confined and established cyclone.

The condensation of the saturation water from the sucked air provides the system with an external thermal energy source which keeps the confined cyclone in motion even in the absence of paravortical winds, that is to say the fundamental kinetic flow used for the priming and unleashing of the cyclone. Sufficiently large hydric hothouses 30 provide a natural and economical system for trapping solar energy and transforming it into the kinetic energy of rising air which can be used and transformed in a converter with turbines and propellers 9 to produce electrical power.

The air 42 as well as the air at the top of tank 44 collects and rises through the vortical duct 23 actuating the propellers 24 as it passes through them. This FIG. 5 also shows that the sun's rays 21 heat the face 20, and stiffeners 3 and 5 are streamlined, which form part of adjacent convectors traversed by the air from wind direction 12.

All the components described up until now with reference to FIG. 5 can be used together or separately.

Of course, the arrangement shown in this FIG. 5 is neither restricting nor limiting, and the face 20, the hydric hothouse 30 and the burners 22 (FIG. 4) can be arranged in any manner providing that the physical effect of regulation and integration of the flows are combined in an ascending driving vector of the air column propelling the elements for converting the energy received into electrical energy for turbines, propellers etc., which are coupled to the generators or other means of exploitation such as pumps, compressors or accumulators.

In a manner similar to that in which cyclonic towers are produced, an anti-cyclonic tower is obtained if the rotational direction of the entering air is reversed, with the characteristic inherent in it and in our hemisphere that the vortex will travel from top to bottom instead of from bottom to top as things happen in the opposite direction in the other hemisphere.

Figure 6:
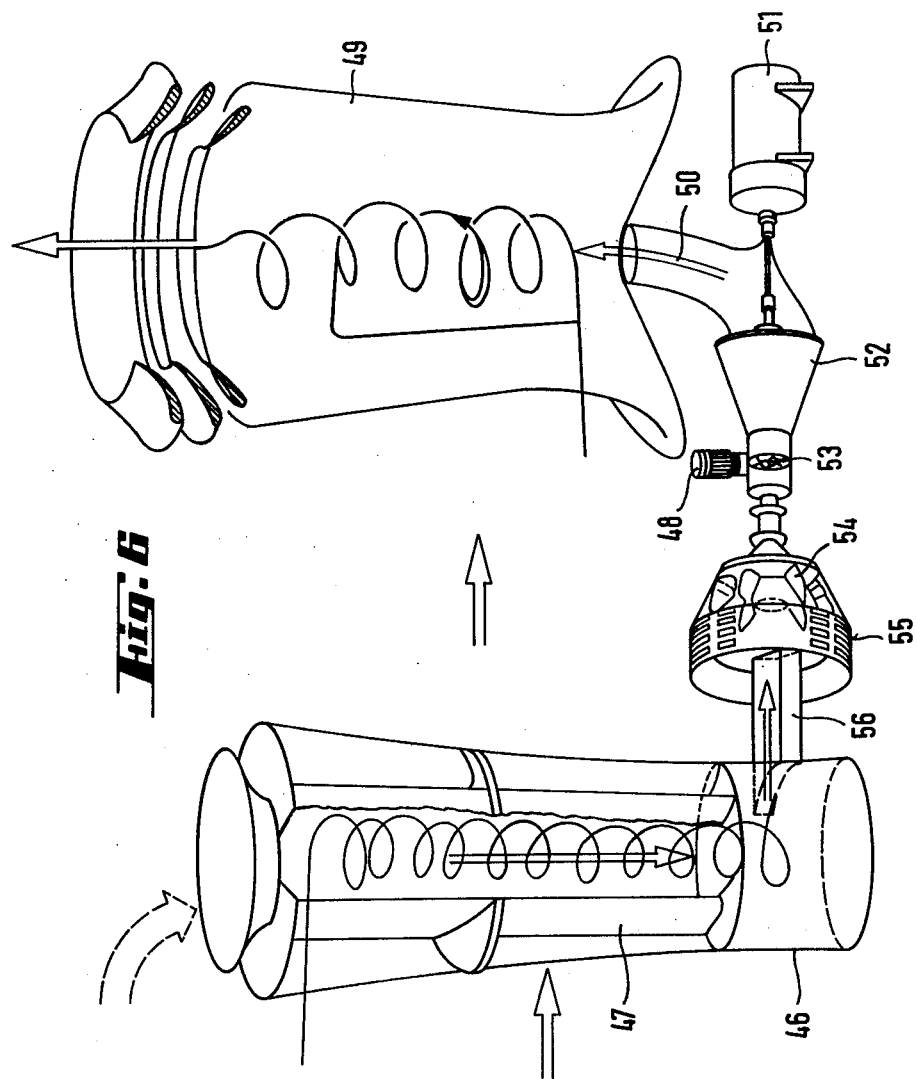
FIG. 6 illustrates a combined cyclonic-anti-cyclonic synergetic system.

FIG. 6 shows a combined cyclonic-anti-cyclonic system which is synergetic. The method of making use of the combined effects of a cyclonic tower and an anti-cyclonic tower will be described with reference to this FIG. 6. In fact, by connecting a decyclonizer 46 to an anti-cyclonic tower 47, the flow will be sent through a duct 56 traversing an energy converter 52 which actuates an electric generator, for example 51, continuing to travel in the direction of the arrow 50 where it is sucked through the cyclonic tower 49. The system is completed and improved by a combustion module 55 provided with burners 54 which supply energy when the climatic conditions do not assist operation of the system.

Finally, a plate diaphragm 53 which is operated by a hydro-pneumatic servo-mechanism 48 opens or closes the suction duct 56, thus controlling operation and including the power of the system.

When the axes of the cyclonic and anti-cyclonic towers 49 and 47 are spaced apart as viewed in the direction 50 of the prevailing flow, the space being known as the "disturbance length", the system is such that the second tower 49, aligned with the main uniform flow, receives the flow already disturbed in velocity by the first tower 47, the energy per unit area of collection in the second tower 49 being increased significantly due to the higher velocity of the flow disturbed by the first tower 47 in the direction 50 of the flow.

The cyclonic system combined with the anti-cyclonic system with a disturbed rate in the flow demands the bringing together of the conversion units (towers 47 and 49) while the conventional propeller system demands the separation of the propeller supporting towers.

In this case, it is found that, unlike what happens with the conventional propeller-type converters when one flow is caused to act upon another, the combination of the two towers 47 and 49 collects more energy than each tower would collect individually.

A dual combination like the one just described is suitable for single-direction flows like those existing in mountain gorges for catabatic (abating) flows or in coastal zones for thermal winds.

These combined cyclonic-anti-cyclonic systems are obviously improved by removing some screens located on the leeward or windward side between the towers 47 and 49 or by replacing them with guide screens. The optimum disturbance length is a function of the prevailing mean velocity of the flow. The distance at which this phenomenon takes place with maximum intensity will be called "induced disturbance length".

The compound or combined arrangement of the symmetrically reciprocal cyclonic-anti-cyclonic systems permits high density energy collection and conversion systems for wind energy to be concentrated over relatively small areas. This phenomenon is identical to and has the same causes as the disturbances in the wind between high-rise buildings.

Figure 7:
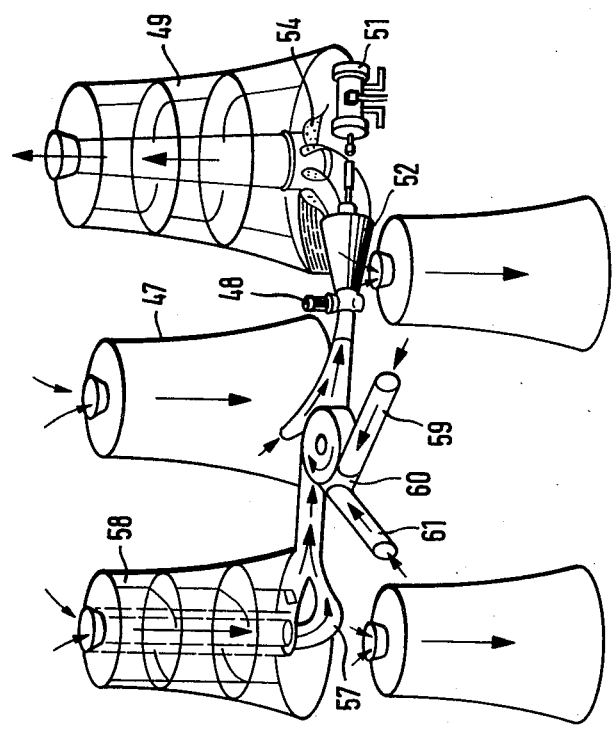
FIG. 7 is a diagrammatic representation of the mode of connection of units as shown in FIG. 4.

FIG. 7 shows diagrammatically the connection between the various units such as those described above which are spaced apart at distances known as induced disturbance length which, as already stated, is the distance producing the optimum output, the units being situated in such a way that their distribution is similar to the pattern of winds and velocities prevailing at the location. This multiple combination results in an induced disturbed flow which we will call for short "poly-fluper" (from poly-flujo-perturbado), which produces a high output in the concentration of wind energy since this arrangement is the most suitable for the construction of large power stations based on wind energy, producing levels of installed power similar to those of large thermal, hydraulic or nuclear power stations.

FIG. 7 shows an example of a multiple combination for omni-directional wind comprising a cyclonic unit and several anti-cyclonic units distributed in a horizontal plane over the pattern of prevailing winds and directions, illustrating how various anti-cyclonic units 58, each with their decyclonizer 57. In the anti-cyclonic unit 47 air is arriving via intake ducts 61 and 59 which converge in the collector 60, the energy originating therefrom traversing the diaphragm regulated by the servomechanism 48 and then arriving at the energy converter unit 52, actuating the electrical generator 51, and passing through the duct with burners 54 operated by hydrogen or a different fuel situated around its periphery, finally traversing the cyclonic module 49 in which the flow therefrom is combined with the earlier flows producing the maximum energy.

In the following pages, we will describe in sufficient detail some of the components of the systems forming the subject of this specification:

The devices blocking the vortical duct tend to close when the air attempts to issue outwards from the vortical duct and to open when the air tends to pass towards the vortical duct.

Although deflectors and diffusers have opposing functions, in the cyclonic-anti-cyclonic energy system, due to the axial symmetry of the flows in each, the designs can be identical with a deflector for channeling and concentrating the flow in the case of an anti-cylonic flow whereas the opposing function of distributing and diffusing the issuing flow into a uniform flow can be fulfilled in a cyclonic system.

Figure 8:
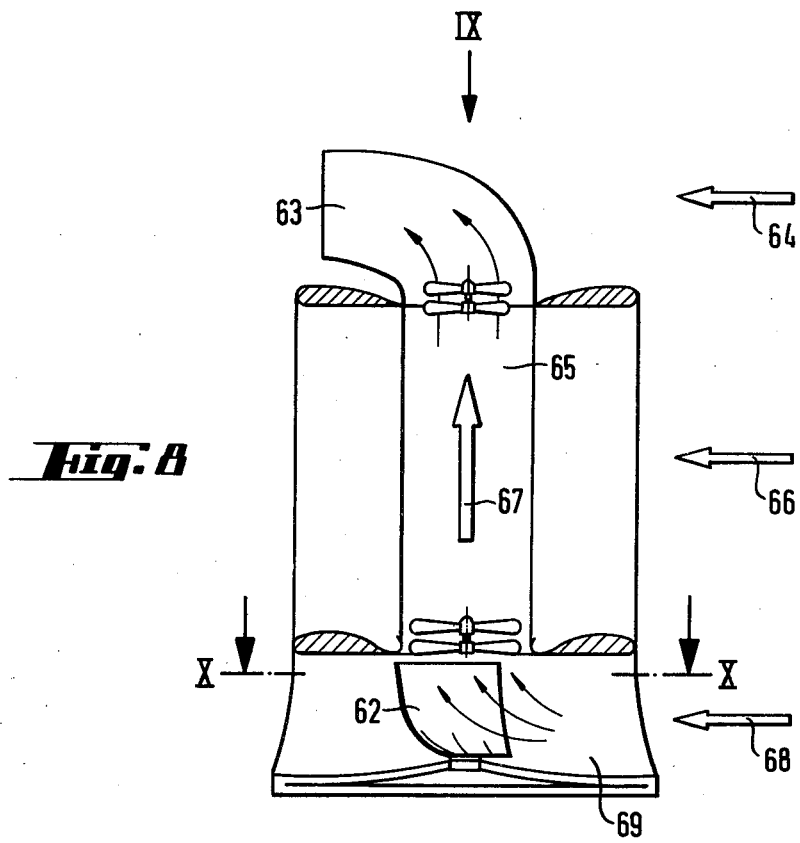
FIG. 8 is a diagram of an arrangement of deflector diffusers.

FIG. 8 shows a diagram of such an arrangement with several deflector diffusers with tubular bends, with the aim of increasing and improving the energy collection and conversion capacity of the installation.

Although the structural geometric relationships are different, in order to produce an omni-directional orientation relative to the wind which is suitable in both cases, the principle is the same.

Figures 9, 10:
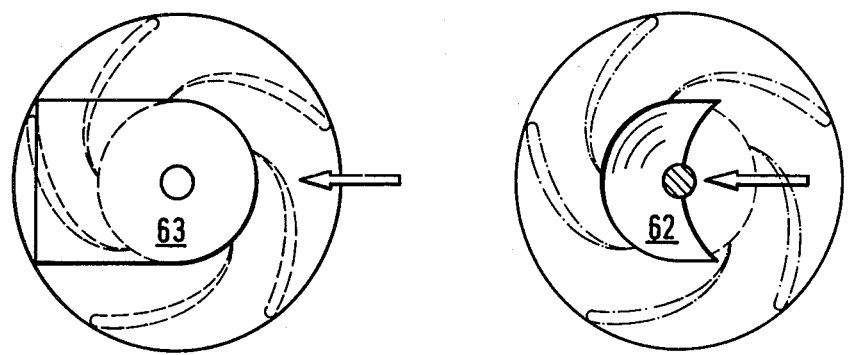
FIG. 9 is a plan view of the arrangement shown in FIG. 8.
FIG. 10 is a section on line X—X of FIG. 8.

FIG. 9 shows a plan view of FIG. 8, and FIG. 10 is a section along line X—X in FIG. 8.

The flow from direction 68 which enters at inlet 69 (FIG. 8) covers the secondary flow sucked in by the vortical duct 65 in a cyclonic system from the wind travelling in direction 66. The external flow 64 entering above the diffuser 63 also creates a leeward depression which assists the suction and diffusion of the issuing flow. This produces the geometric addition of the generated energy vectors 67.

This FIG. 8 shows clearly that the diffuser 63 also acts as a deflector 62.

Figure 11:
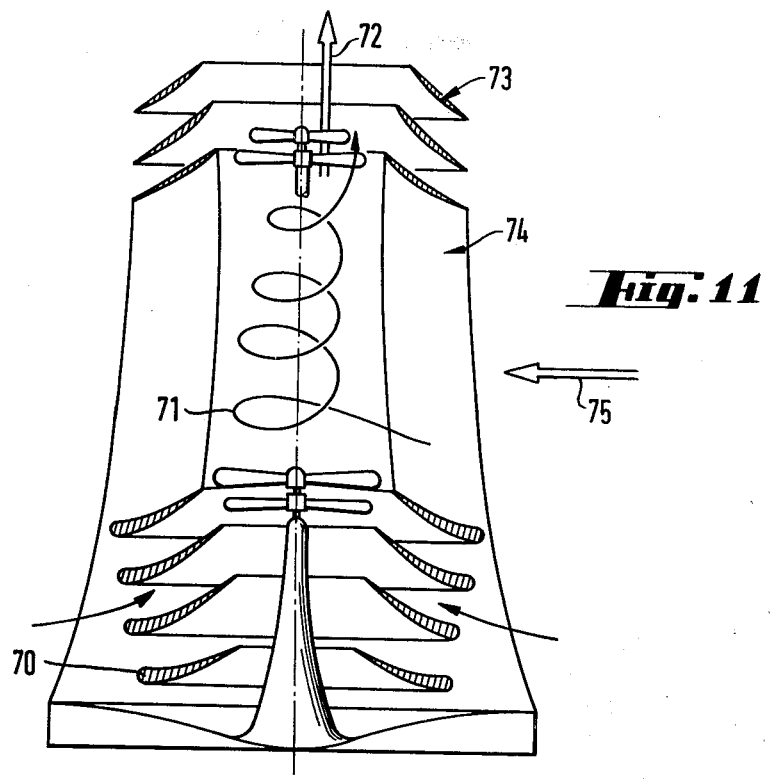
FIG. 11 shows a cyclonic conversion device with fixed concentric screens.
Figure 12:
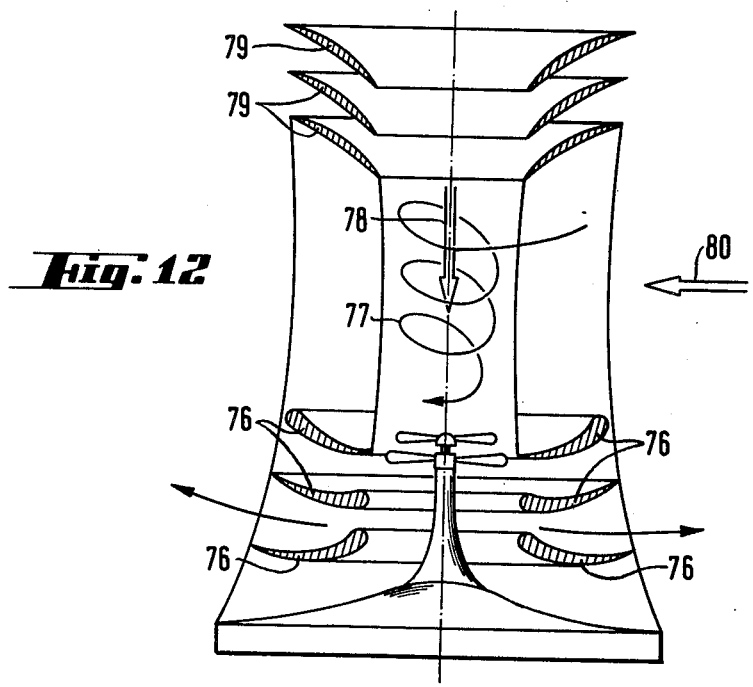
FIG. 12 shows an anti-cyclonic conversion device.

When changing hemisphere with the same system, the deflectors 62 act as diffusers 63 and the diffusers 63 act as deflectors 62, and they are all utilized for the first time in these cyclonic and anti-cyclonic systems and they can be either capable of orientation or static and concentric like those shown in FIG. 11 which shows a cyclonic conversion device with fixed screens 74 which form the corresponding convectors provided with blocking devices 18 (FIG. 3) which oscillate in the direction of the main flow. In the case which we are describing with reference to FIG. 11, the deflectors and diffusers can be constructed in the form of a disc with an orifice in the centre and with a streamlined cross-section, parallel to each other converging and/or diverging from the inside out or from the outside in, depending on whether they have the function of diffusion or deflection (FIG. 12). In FIG. 11, in the case of a cyclonic system converting a horizontal wind 75 into a vortex 71 with propulsion in direction 72 and in the northern hemisphere, a top diffuser 73 would collect the flow at the top, preventing the occurrence of horizontal shearing forces when the vortical flow leaves the tower and thus helping the soft leeward shift of the vortex and its diffusion in the uniform main flow.

The base deflector 70 acts similarly at the base, preventing the formation of low pressures. In this case, the significant difference can be convergence in the diffuser or diffusers and divergence in the deflectors, as shown in FIG. 12 which illustrates an anti-cyclonic system.

In FIG. 12, the incident energy flow 80 rotating in a clockwise direction 77 causes a descending flow 78 toward the energy converters. The head deflectors 79 compel the flow to descend through a vortical duct while the base diffusers 76 create a depression due to their convergence which helps the exit of the descending flow.

The deflector diffuser is consequently formed by one, two or more discs of variable size with a concentric orifice in the centre thereof with a streamlined cross-section which converges and/or diverges from the inside out or from the outside in, depending on whether it acts as a diffuser or deflector.

In the northern hemisphere, with an anti-cyclonic system according to FIG. 12, the deflectors 79 diverge towards the centre whereas the diffusers 76 converge towards the axis.

Deflector diffusers of the venturi or cylindrical or hemispherical type with doubly swinging plates are obviously also utilized frequently and are widely used in these systems as well as deflector diffusers combined with all those mentioned up until now.

In order to transform and utilize the energy in the transposed flow (or secondary vortical ascending or descending, linear or rotating flow), there are used various devices such a double or single concentric, contra-rotating turbines as well as conventional propellers or propellers modified according to the geometry and the flow of the path of the lines of the energy current, or double, contra-rotating propellers arranged in the secondary flow to make use of the sucked or propelled flow or the ascending thermal flow, if any, for the cyclonic or anti-cyclonic systems described herein as well as the main paravortical or substantially horizontal flow.

Other possible devices include turbines with multiple blades and a fixed or rotating deflector for air and/or hot gases in simple cyclonic installations, combined anti-cyclonic installations or multiple poly-fluper installations.

In all cases, the use of simple propellers or turbines for the conversion of the transposed or induced energy flow produces a low collection capacity of the order of 59% maximum. In order to improve this capacity, double contra-rotating energy converters are connected to the cyclonic and anti-cyclonic systems to produce indices of collection of approximately 83%.

For this purpose, it is necessary to reverse the direction of rotation of the resultant force by combining it with the force of the other concentric device, as shown in FIG. 13. In this FIG. 13, the propeller 85, which can be substituted by a rotor or turbine, rotates in a given direction entraining the axle 86, for example, in a clockwise direction while the propeller 84 which entrains the axle 83 rotates in the opposite direction. Owing to the conical gears 87 and 82, this rotational direction is reversed in such a way that the body 81 rotates in the same direction as the axle 86, making the movement of the two axles 83 and 86 integral by means of the pin 88.

The flow collector (FIG. 14) has the object of channelling and orientating the flows from various anti-cyclonic systems or sucked by the cyclonic system towards the common energy converter, and for this purpose it is constituted essentially by a body 89 whose walls are formed by two concentric or non-concentric cylinders which are closed at the top and the bottom.

The ducts 90 transporting the flow from the anti-cyclonic systems enter this body 89. To produce the cylindrical configuration of the flow, it circulates circumferentially, permitting the subsequent addition of flows from other systems, up to a given point at which a tangential screen 92 is connected to a common outlet duct 91.

The flow from duct 91 can be connected to an energy converter and to the suction of a cyclonic tower.

When it is necessary to transform the non-rotating and rotating flow of the vortex into a linear flow again so that it can be integrated into the common flow, for example, by decyclonizing and devortizing the flow, there are devices called decyclonizers or devortizers, as illustrated in FIG. 15, which shows that the device essentially consists of two concentric cylinders 95 and 94 in whose interior there is arranged a conoidal deflecting surface 97 which compels the flow to enter the curvilinear duct 98. The rotating flow 96 is composed of the asymmetrical sheet legs 99 with the linearized flow of the vortex 93 descending in the duct 101. This linearized flow 100 can be integrated in the collector with flows from other origins or towers.

By throttling the flow 100 at the beginning or end of the vortical column, the fluid volume in the column and, consequently, the energy therein changes per unit time.

Figure 16:
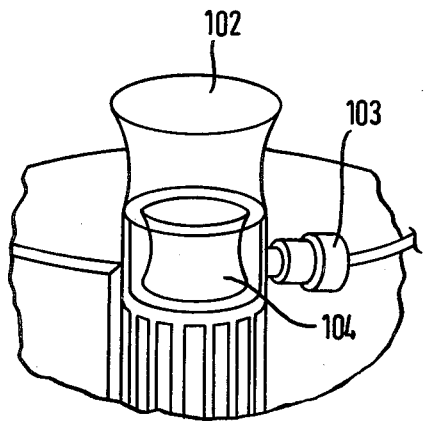
FIGS. 16, 17 and 18 show alternative forms of flow regulation devices.
Figure 17:
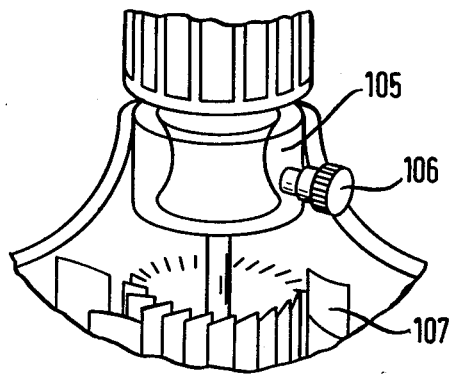

Regulators such as the one shown in FIG. 16 effect this regulation at the head or, like the one shown in FIG. 17, at the base. Both devices regulate by means of an elastic cylindrical diaphragm 104 or 105 which is situated at the end or at the beginning of the vortical column, respectively. With the regulator in FIG. 16, the flow reaches the nozzle 102 after traversing the elastic diaphragm 104, controlled by the servo-compressor and control valve 103.

The regulating devices are formed by a strong external cylinder and another flexible diaphragm-like concentric internal cylinder of which the diameter varies as a function of the pressure and/or vacuum regulated in the interior or cavity of the two cylindrical bodies via a servo-compressor and control valve 103 or servo-regulator 106. The diffuser or deflector devices 107 can be seen at the base.

Figure 18:
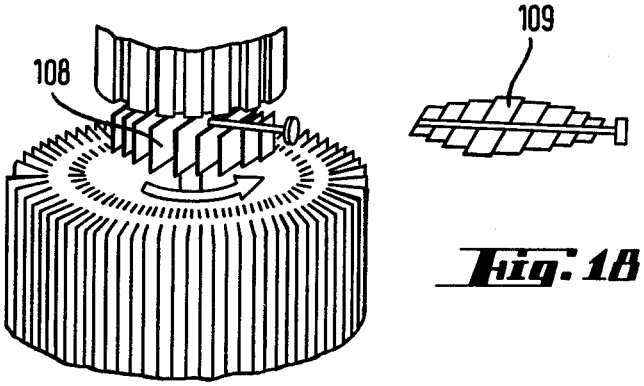

FIG. 18 shows a regulating device which is arranged without distinction at the beginning and/or at the end of the vortical column and which consists essentially of a variable number of flaps or shutters composed of slats which open and close the vortical duct, regulating the flow through the vortical duct. This FIG. 18 clearly shows how the flaps 108 located in the flow path correspond to the open position of the regulator whereas the flaps 109 correspond to the closed position.

The irregularity of wind energy means that it must be possible to accumulate the surplus energy in order to satisfy the demand, as in the case of hydraulic energy. One of the basic applications of the claimed system is mass production for the accumulation of wind energy in the same way as solar energy which we will describe separately below owing to its importance.

First of all, a hydro-wind system can be produced in the following manner:

The electrical energy from cyclonic and/or anti-cyclonic power stations can be applied to the operation of reciprocating pumps or turbines or reciprocating generators which pump water from the opposing dams in hydraulic installations so that the water consumption for the production of electricity is reduced to evaporation or filtration losses.

This arrangement opens up great possibilities not expected hitherto. Firstly, it permits the exploitation of hydraulic basins which, owing to their steep gradient, did not allow large tailings dams and a damming capacity sufficient to justify the installation of hydro-electric power stations. Secondly, in locations where they already exist, it liberates large volumes of water for industrial, agricultural or domestic use which, up until now, had to be available in reservoirs in order to be used for energy.

Since the cyclonic anti-cylonic system relies on inexhaustible and recoverable wind energy, radiant solar energy and marine thermal energy, it makes it possible to construct large power stations having a potential level per unit of the order of thermal, hydraulic or nuclear energy, thus altering the accepted premises on the availability of water and energy.

Cyclonic hydrogen system: by applying the energy obtained in cyclonic anti-cyclonic units, with or without assistance, to electrolytic modules supplied with sea water or unhygienic water, it is possible to obtain hydrogen at low cost and this makes it possible to obtain methanol or liquid fuels or, in combination with carbon, hydrocarbons, by means of the relevant technology.

One hydrogen wind unit can produce energy and other valuable products or, in turn, hydrogen, oxygen, all types of salts, and desalinated water.

Just as the hydro-wind system is justifiable in mountainous countries, the hydrogen-wind system is particularly suitable for countries with coastal zones or with internal lakes or landlocked seas.

In view of the characteristics of the invention which is claimed in a general manner and with reference to concrete embodiments, it can be stated that the systems for obtaining energy by means of flows similar to those forming a natural cyclone or anti-cyclone can be constituted by the shapes and sizes considered to be most convenient and by the most suitable materials for each concrete application, without variations such as those which might occur in details of presentation and finish affecting the essence claimed, since the systems constructed in accordance with such characteristics with any of these modifications will only be variations which are also included and protected by the present claims.

I claim:

1. A wind-solar energy conversion system utilising cyclonic or anticyclonic fluid flow comprising:
    a cyclonic conversion tower having an axial fluid flow vortex duct;
    at least one fluid flow convector arranged vertically in the tower for concentrating lateral wind flow into the tower into axial fluid flow along said vortex duct;
    diffuser/deflector means, arranged at one end of the tower, for augmenting fluid flow output;

means, arranged at the top and bottom of the tower, for converting kinetic fluid flow energy into another mode of energy;
a base means for supporting the tower and for admitting solar energy to augment energy output; and
a heating system, arranged in the tower, for augmenting energy output when climatic conditions result in an insufficient supply of solar energy.

2. The energy conversion system according to claim 1 wherein:
said base means incorporates a wind energy means for generating the axial fluid flow for integration with the lateral wind flow, and
said heating system utilises a fluid fuel to generate and augment axial fluid flow.

3. The energy conversion system according to claim 1 further comprising:
an elastic cylindrical diaphragm means, situated in the tower, for throttling the fluid flow therethrough.

4. An energy conversion system utilising cyclonic or anticyclonic fluid flow comprising:
a cyclonic conversion tower having an axial fluid flow vortex duct;
at least one fluid flow convector arranged vertically in the tower, for concentrating lateral wind flow into the tower into axial fluid flow along said vortex duct;
diffuser/deflector means, arranged at one end of the tower, for augmenting fluid flow output;
means, arranged at the top and bottom of the tower, for converting kinetic fluid flow energy into another mode of energy;
a base means for supporting the tower and for admitting solar energy to augment energy output; and
a heating system, arranged in the tower, for augmenting energy output when climatic conditions result in an insufficient supply of solar energy;
wherein the at least one fluid flow convector includes two vertical screens generated by profiles which are tangential to the direction of axial fluid flow and further includes stiffeners joining together the vertical screens and having a streamlined profile, said screens merging into said vortex duct.

5. An energy conversion system utilising cyclonic or anticyclonic fluid flow comprising:
a cyclonic conversion tower having an axial fluid flow vortex duct;
at least one fluid flow convector arranged vertically in the tower for concentrating lateral wind flow into the tower into axial fluid flow along said vortex duct;
diffuser/deflector means, arranged at one end of the tower, for augmenting fluid flow output;
means, arranged at the top and bottom of the tower, for converting kinetic fluid flow energy into another mode of energy;
a base means for supporting the tower and for admitting solar energy to augment energy output; and
a heating system, arranged in the tower, for augmenting energy output when climatic conditions result in an insufficient supply of solar energy;
wherein the at least one fluid flow convector includes two vertical screens generated by profiles which are tangential to the direction of axial fluid flow and further includes stiffeners joining together the vertical screens and having a streamlined profile,
said system further comprising:
fluid flow blocking devices mounted on damping arms and turnable to and from positions in which they prevent fluid flow into or out of the vortex duct.

6. An energy conversion system utilising cyclonic or anticyclonic fluid flow comprising:
a cyclonic conversion tower having an axial fluid flow vortex duct;
at least one fluid flow convector arranged vertically in the tower for concentrating lateral wind flow into the tower into axial fluid flow along said vortex duct;
diffuser/deflector means, arranged at one end of the tower, for augmenting fluid flow output;
means, arranged at the top and bottom of the tower, for converting kinetic fluid flow energy into another mode of energy;
a base means for supporting the tower and for admitting solar energy to augment energy output; and
a heating system, arranged in the tower, for augmenting energy output when climatic conditions result in an insufficient supply of solar energy;
wherein said at least one fluid flow convector is a hollow body formed by curvilinear and truncated pyramidal surfaces;
said system further comprising:
fluid flow blocking devices which are each movable about a vertical axis and are equipped with damping arms, and
servo-mechanism means for concentrating power due to fluid flow to the at least one fluid flow convector.

7. An energy conversion system utilising cyclonic or anticyclonic fluid flow comprising:
a cyclonic conversion tower having an axial fluid flow vortex duct;
at least one fluid flow convector arranged vertically in the tower for concentrating lateral wind flow into the tower into axial fluid flow along said vortex duct;
diffuser/deflector means, arranged at one end of the tower, for augmenting fluid flow output;
means, arranged at the top and bottom of the tower, for converting kinetic fluid flow energy into another mode of energy;
a base means for supporting the tower and for admitting solar energy to augment energy output;
a fluid fuel heating system, arranged in the tower, for augmenting energy output when climatic conditions result in an insufficient supply of solar energy;
a wind energy means, incorporated into the base means, for generating the axial fluid flow for integration with the lateral wind flow; and
a low level water tank in the base means of the tower,
an hydric hothouse being connected to the low level water tank and having a thermally absorbent black bottom,
pipe means, interconnecting the hydric hothouse with the low level water tank, for supplying heated water from the hydric hothouse to the low level water tank.

* * * * *